US009235864B1

(12) United States Patent
Maeng

(10) Patent No.: US 9,235,864 B1
(45) Date of Patent: Jan. 12, 2016

(54) SYSTEMS, METHODS, AND MEDIUMS CONFIGURED TO CREATE A CONVERSATIONAL EMAIL MESSAGE

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 355 days.

(21) Appl. No.: 13/326,684

(22) Filed: Dec. 15, 2011

(51) Int. Cl.
G06Q 50/00 (2012.01)
H04L 12/58 (2006.01)

(52) U.S. Cl.
CPC ............... *G06Q 50/01* (2013.01); *H04L 51/32* (2013.01)

(58) Field of Classification Search
USPC ......................................................... 709/206
See application file for complete search history.

(56) References Cited

U.S. PATENT DOCUMENTS

2002/0023128 A1* 2/2002 Matsumoto et al. .......... 709/204
2009/0138828 A1* 5/2009 Schultz et al. ................ 715/853
2010/0312836 A1* 12/2010 Serr et al. ...................... 709/206

* cited by examiner

*Primary Examiner* — Angela Nguyen
(74) *Attorney, Agent, or Firm* — Schwabe, Williamson & Wyatt, P.C.

(57) ABSTRACT

The present disclosure describes systems, methods, and mediums configured to create a conversational email message. A computing device is configured to transmit an outgoing message from a sender to a plurality of recipients and create a conversational message by combining the outgoing message with a chronological listing of reply messages received from any of the plurality of recipients or the sender in response to a conversational email indicator. A memory device is configured to store the outgoing message or any of the reply messages.

25 Claims, 5 Drawing Sheets

SYSTEMS, METHODS, AND MEDIUMS CONFIGURED TO CREATE A CONVERSATIONAL EMAIL MESSAGE

TECHNICAL FIELD

The present disclosure is related to systems, methods, and mediums configured to create a conversational email message.

BACKGROUND

A system may transmit an electronic mail message, e.g., an email, from a sender to a recipient over a network. The system may operate based on a store-and-forward model in which a server stores and subsequently forwards the electronic mail message for later retrieval by the recipient. The store-and-forward model eliminates a need for the sender and the recipient to be online simultaneously. Email may be considered an asynchronous form of communication since the recipient may retrieve and reply to the electronic mail message at any time.

One disadvantage of known systems is that when the sender transmits an electronic mail message to a group of recipients, each recipient may reply to the message asynchronous from other recipients, thereby creating multiple message branches or message threads that make it difficult to clearly follow the group's discussion. As the number of message branches or message threads grow, it becomes more difficult to clearly follow the group's discussion.

BRIEF DRAWINGS DESCRIPTION

DETAILED DESCRIPTION

Figure 1:
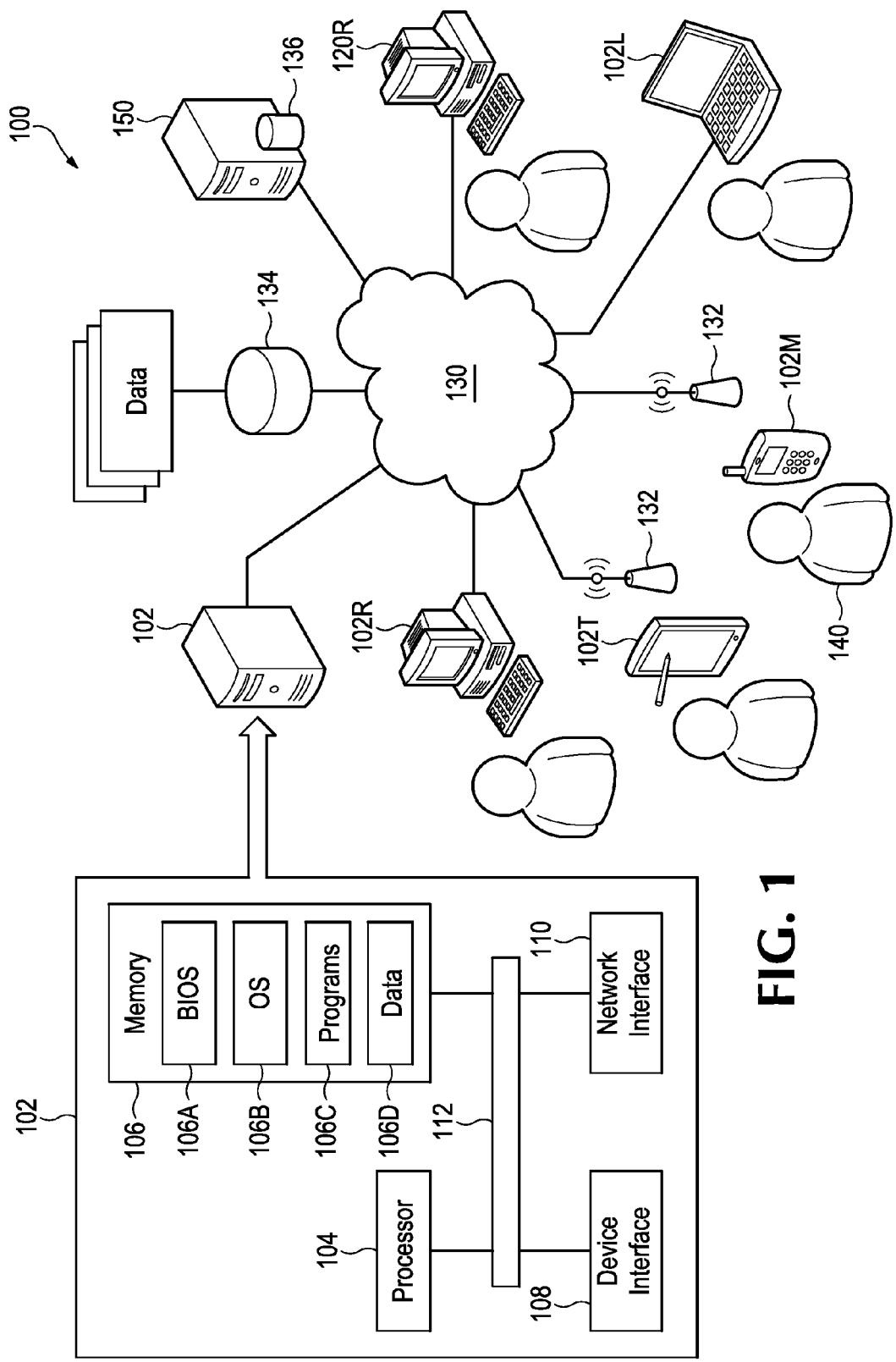
FIG. 1 depicts a block diagram of an exemplary system configured to create a conversational email message.

FIG. 1 depicts a block diagram of an exemplary system configured to create a conversational email message. Referring to FIG. 1, system 100 may include a computing device 102 that may execute instructions of application programs or modules 106C stored in system memory, e.g., memory device 106. Application programs or modules 106C may include objects, components, routines, programs, instructions, data structures, and the like that perform particular tasks functions or that implement particular abstract data types. Some or all of application programs 106C may be instantiated at run time by processing device 104. A person of ordinary skill in the art readily will recognize that many of the concepts associated with system 100 may be implemented as computer instructions, firmware, or software in any of a variety of computing architectures, e.g., computing device 102, to achieve a same or equivalent result.

Moreover, a person of ordinary skill in the art readily will recognize that system 100 may be implemented on other types of computing architectures, e.g., general purpose or personal computers, hand-held devices, mobile communication devices, multi-processor systems, microprocessor-based or programmable consumer electronics, minicomputers, mainframe computers, application specific integrated circuits, and like. For illustrative purposes only, system 100 is shown in FIG. 1 to include computing devices 102, geographically remote computing devices 102R, tablet computing device 102T, mobile computing device 102M, and laptop computing device 102L.

Similarly, a person of ordinary skill in the art readily will recognize that system 100 may be implemented in a distributed computing system in which various computing entities or devices, often geographically remote from one another, e.g., computing device 102 and remote computing device 102R, perform particular tasks or execute particular objects, components, routines, programs, instructions, data structures, and the like. For example, system 100 may be implemented in a server/client configuration (e.g., computing device 102 may operate as a server and remote computing device 102R, tablet computing device 102T, mobile computing device 102M, or laptop computing device 102L may operate as clients). In system 100, application programs 106C may be stored in local memory device 106, external memory device 136, or remote memory device 134. Local memory device 106, external memory device 136, or remote memory device 134 may be any kind of memory known to a person of ordinary skill in the art including random access memory (RAM), flash memory, read only memory (ROM), ferroelectric RAM, magnetic storage devices, optical discs, and the like.

Computing device 102 may comprise processing device 104, memory device 106, device interface 108, and network interface 110, which all may be interconnected through bus 112. Processing device 104 may represent a single, central processing unit, or a plurality of processing units in a single computing device 102 or plural computing devices, e.g., computing device 102 and remote computing device 102R. Local memory device 106, external memory device 136, and/or remote memory device 134 may be any type of memory device, such as any combination of RAM, flash memory, ROM, ferroelectric RAM, magnetic storage devices, optical discs, and the like. Local memory device 106 may include a basic input/output system (BIOS) 106A with routines to transfer data, including data 106D, between the various elements of system 100. Local memory device 106 also may store an operating system (OS) 106B that, after being initially loaded by a boot program, manages other programs in computing device 102. Local memory device 106 may store routines or programs 106C designed to perform a specific function for a user or another application program, e.g., message transfer agent (MTA) or mail user agent (MUA) programs we describe in more detail below. Local memory device 106 additionally may store any kind of data 106D, e.g., an email (not shown).

Device interface 108 may be any one of several types of interfaces. Device interface 108 may operatively couple any of a variety of devices, e.g., hard disk drive, optical disk drive, magnetic disk drive, or the like, to bus 112. Device interface 108 may represent either one interface or various distinct interfaces, each specially constructed to support the particular device that it interfaces to bus 112. Device interface 108 may additionally interface input or output devices utilized by a user to provide direction to computing device 102 and to receive information from computing device 102. These input or output devices may include keyboards, monitors, mice, pointing devices, speakers, stylus, microphone, joystick, game pad, satellite dish, printer, scanner, camera, video equipment, modem, monitor, and the like (not shown).

Device interface 108 may be a serial interface, parallel port, game port, firewire port, universal serial bus, or the like.

A person of skill in the art readily will recognize that system 100 may comprise any type of computer readable medium accessible by a computer, such as magnetic cassettes, flash memory cards, digital video disks, cartridges, RAM, ROM, flash memory, magnetic disc drives, optical disc drives, and the like.

Network interface 110 may operatively couple computing device 102 to remote computing devices 102R, tablet computing devices 102T, mobile computing devices 102M, and/or laptop computing devices 102L, on network 130. Network 130 may be a local, wide area, or wireless network, or any other type of network capable of transmitting email messages from one computing device to another computing device. Computing devices 102R may be geographically remote from computing device 102. Remote computing device 102R may have a structure corresponding to computing device 102, or may operate as a server, client, router, switch, peer device, network node, or other networked device and may include some or all of the elements of computing device 102. Computing device 102 may connect to the local or wide area network 130 through a network interface or adapter included in interface 110, may connect to the local or wide area network 130 through a modem or other communications device included in the network interface 110, may connect to the local or wide area network 130 using a wireless device 132, or the like. Modem or other communication devices may establish communications to remote computing devices 102R through global communications network 130. A person of ordinary skill in the art readily will recognize that application programs or modules 106C may be stored remotely through such networked connections.

In one example, computing device 102R may operate as an email client running a mail user agent (MUA) application program and computing device 102 may operate as an email server running a message transfer agent (MTA) application program. Computing device 102R running a MUA application program may allow a user to compose, send and retrieve email messages from an MTA application program running on, e.g., computing device 102. In another example, computing device 102R may access an MUA application program running on a computing device 102L accessible over network 130. The MUA application program may include Microsoft's Outlook, Pegasus' Mail, Mozilla's Thunderbird, Google's gmail, and Apple's Mail. Computing device 102 running the MTA application program may use a variety of protocols to deliver email messages to computing device 102R running the MUA application program, including Post Office Protocol (POP) and Internet Message Access Protocol (IMAP). Other protocols may be used to access email messages, proprietary or otherwise.

Computing device 102 running the MTA application program may transmit an email message through network 130 to a destination server 150 also running the MTA application program. Computing device 150 running the MTA application program may receive an email message through network 130 from computing device 102 also running the MTA application program.

A person of ordinary skill in the art readily will recognize that an electronic message may comprise at least a header and a body. The header may be structured into fields that provide control information including email addresses for the sender and at least one recipient. The header may also contain fields that provide descriptive information including subject and submission timestamps and date stamps. The body may include the content of the electronic message in e.g., plain text or hypertext markup language formats.

Figure 2:
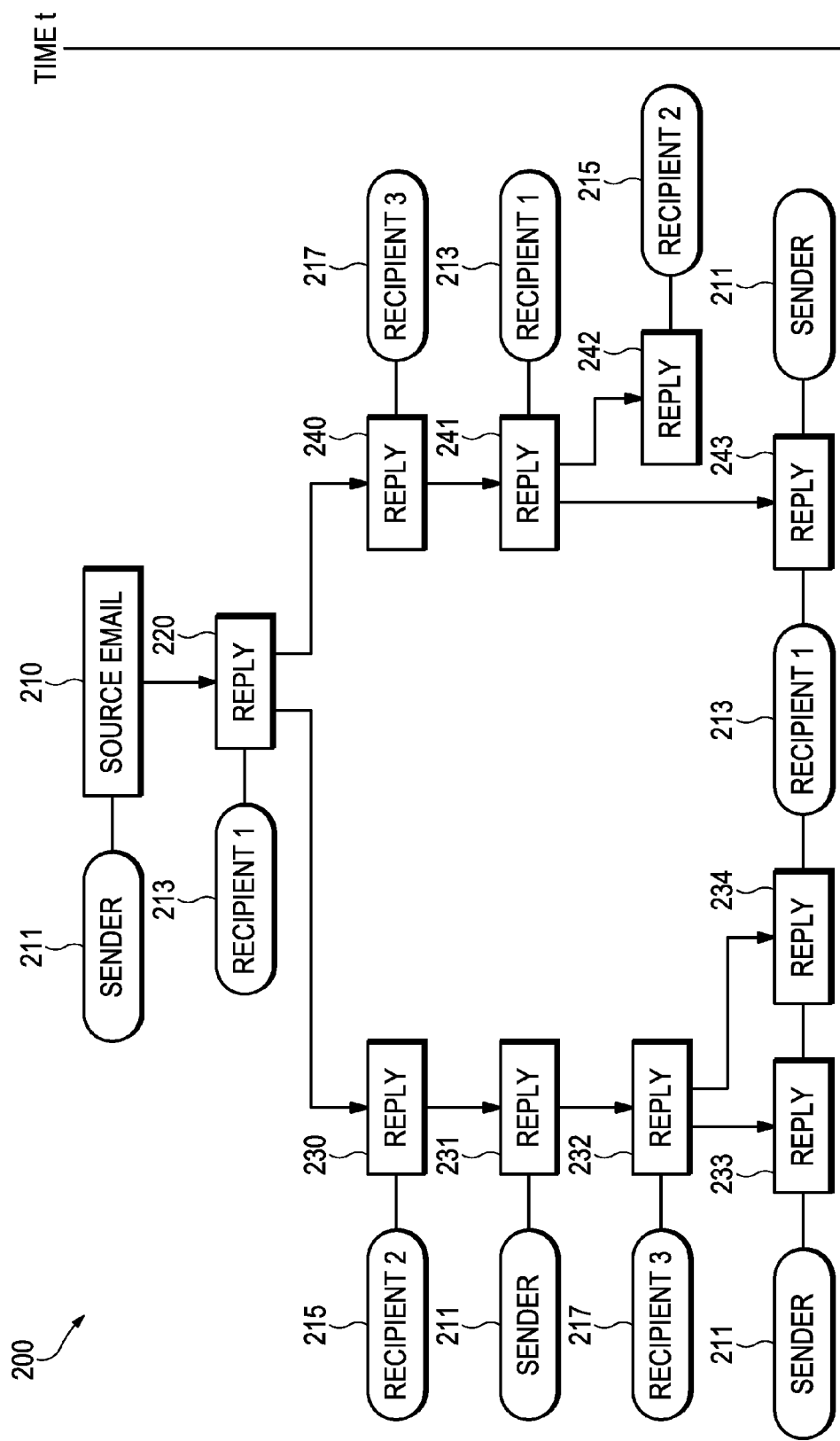
FIG. 2 depicts an illustration of multiple asynchronous message threads.

FIG. 2 depicts an illustration of multiple asynchronous message threads. Referring to FIG. 2, a sender 211 may compose a source email 210 using an MUA operating on computing device 102R at time t0. Sender 211 may transmit source email 210 to at least one computing device 102 running an MTA program for asynchronous access by each of a plurality of recipients 213, 215, 217 through the same or another computing device 102R operating an MUA. Recipient 213 may compose an email 220 in response to source email 210 at time t1 and forward email 220 to recipients 215 or 217. Recipients 215 and 217 may compose emails 230 and 240, respectively, in response to email 220 at time t2. Sender 211 may compose email 231 in response to email 230 and recipient 213 may compose email 241 in response to email 240 at time t3. Recipient 217 may compose email 232 in response to email 231 and recipient 215 may compose email 242 in reply to email 241 at time t4. Sender 211 and recipient 213 may compose emails 233 and 234 in response to email 232 at time t5. Sender 211 may compose email 243 in reply to email 241 at time t5.

Since emails 230 and 240 are both in reply to email 220, they represent two distinct message threads of source email 210. Likewise, emails 233 and 234 represent two distinct message threads of email 232 and emails 242 and 243 represent two distinct message threads of email 241. Each of the recipients of the various email messages 210, 220, 230, 240 and so on may access their messages at different times independent of the response times t0, t1, t2, t3, t4, or t5, thereby making it difficult to ascertain the status of the communication without first having to read the entire message tree including the distinct branches of various emails.

Figure 3:
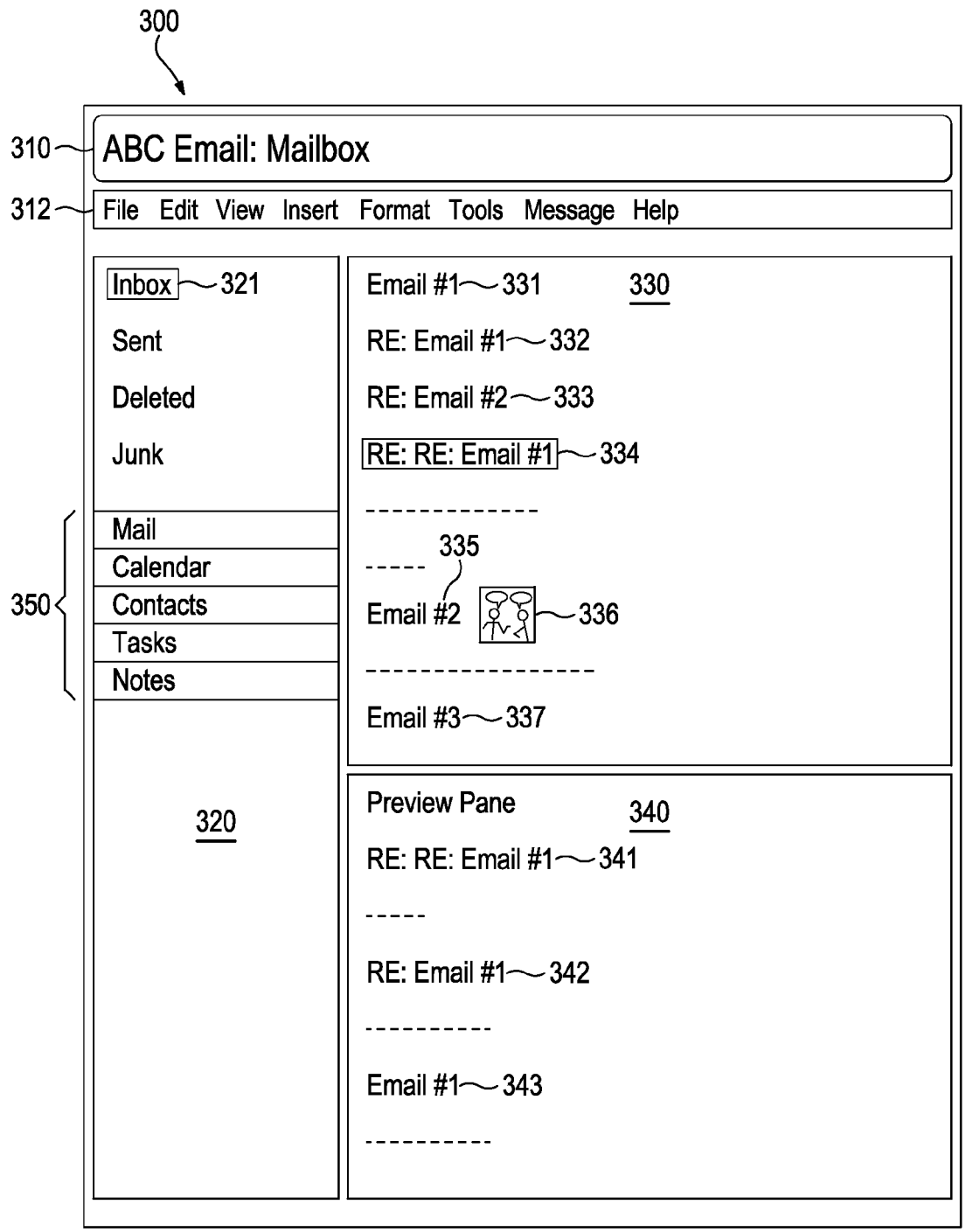
FIG. 3 depicts a screen view of a messaging program with a conversational email function.

FIG. 3 depicts a screen view of an electronic messaging program with a conversational email function. Referring to FIG. 3, screen view 300 includes a title pane 310, a toolbar 312, a navigation pane 320, a reading pane 330, a preview pane 340, and a view pane 350. Title pane 310 may display a title associated with the electronic messaging program running, on e.g., computing device 102R. Toolbar 312 may display a series of selectable icons or text that gives a user the ability to select functions associated with the electronic messaging program, e.g., file, edit, view, insert, format, tools, message, and help. Toolbar 312 may display the icons either on a horizontal row or a vertical column around the edges of screen view 300 where they are visible while the electronic messaging program is in use. Some or all of the selectable icons or text may comprise pull-down menus that provide other logically associated functions, e.g., a pull down menu associated with the file icon or text that may allow the user to save an electronic message.

Navigation pane 320 may display a folder list associated with the electronic messaging program, e.g., an inbox, sent, deleted, or junk folder, or the like. Each folder in the list may comprise particular categories of email messages designated either automatically by the electronic messaging program, e.g., a junk category, or by the user, e.g., a deleted category.

Reading pane 330 may display a list of email messages and their associated email threads by subject, date, or the like. For example, reading pane 330, e.g., via the electronic messaging program that produces reading pane 330, may display email 331 as being associated with email threads 332, 333, and 334. Reading pane 330 also may display the list of email messages by subject after having decoded the message header of the email message. Reading pane 330 further may associate a conversational email icon 336 with a conversational email 335. For example, reading pane 330 may associate a conversational email icon with a conversational email after having decoded the message header to reveal a conversational email indicator. Reading pane 330 may indicate that an email message is new or has not been read by the user by, e.g., bolding the subject of the email. Once the user reads the email, reading pane 330 may display the subject of the email using un-bolded type.

Preview pane 340 may allow the user to preview contents of a selected email message. For example, if the user selects to view email 334, preview pane 340 may display a chain of email replies 341, 342, and 343. View pane 350 may allow the user to switch between functions associated with the electronic messaging program, e.g., mail, calendar, contacts, tasks, notes, or the like.

Figure 4:
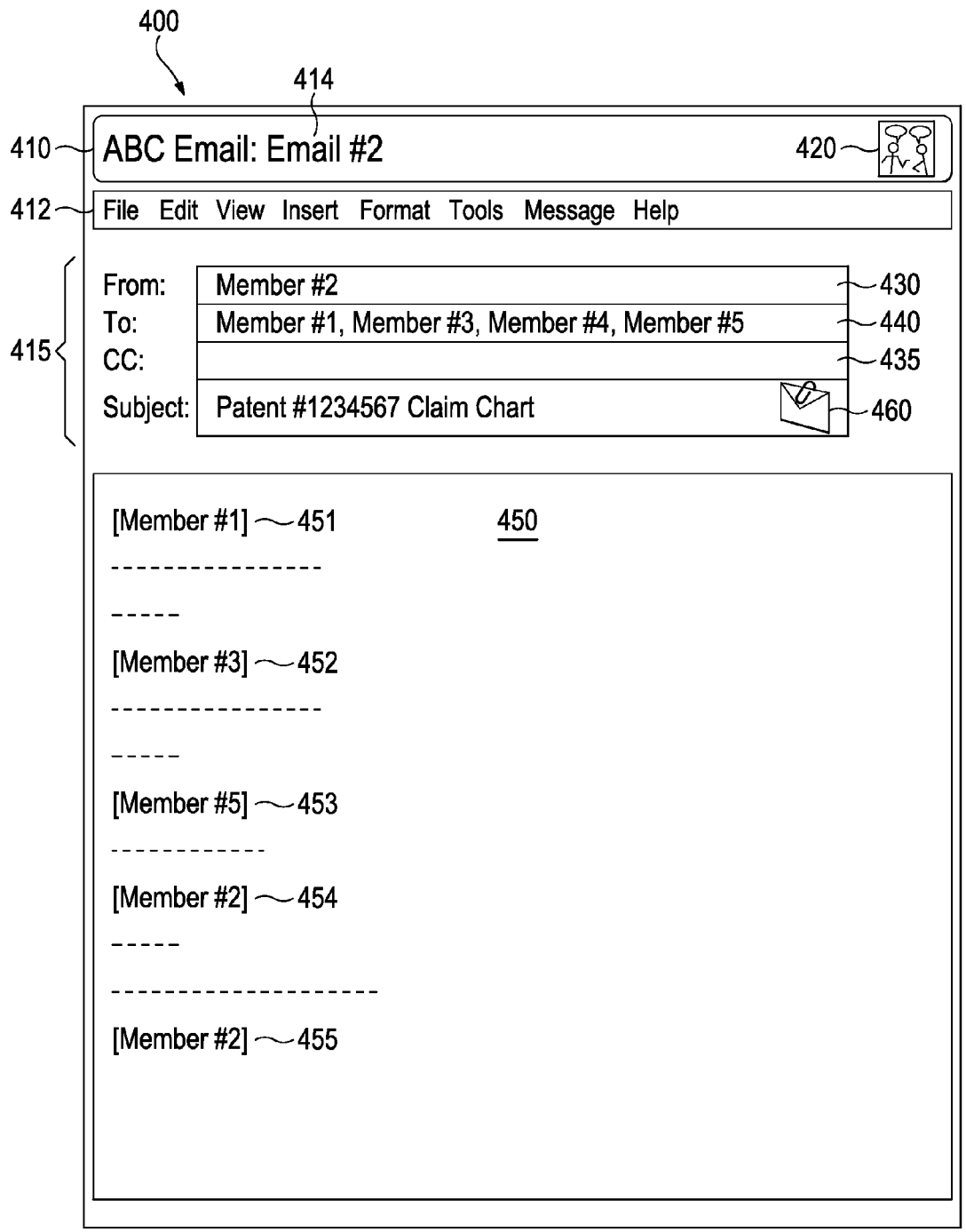
FIG. 4 depicts a screen view of an exemplary conversational email message.

FIG. 4 depicts a screen view of an exemplary conversational email message. Referring to FIG. 4, screen view 400 includes a title pane 410, a toolbar 412, a header pane 415, and a view pane 450. Title pane 410 may indicate that conversational email message 414 is being displayed on view pane 450. Title pane 410 also may display a conversational email icon 420 to indicate that the email 414 is a conversational email. Toolbar 412 may display a series of selectable icons or text that gives the user the ability to select functions associated with the email message being displayed on view pane 450, e.g., file, edit, view, insert, format, tools, message, help, and the like. Header pane 415 may display a header of the conversational email 414 including various fields, e.g., "from" field, "to" field, "cc" field, "subject" field, and the like. The conversational email 414 may include an attachment as indicated by the icon at 460. Sender 430 may compose the conversational email 414 and send it to first through fourth recipients 440.

View pane 450 may display the body or content of the conversational email 414 using a conversational format, e.g., by ordering emails 451, 452, 453, 454, and 455 in chronological order. View pane 450 may display the conversational email 414 in conversational format using the submission timestamps included in the header, after having appropriately decoded the header of each of the messages. Sender 430 or any of the first through fourth recipients 440 may compose a new reply at any time. When this occurs, view pane 450 may display the conversational email 414 and the new reply in chronological order in response to the submission timestamp decoded in the header of the new reply. View pane 450 may display a new, unread, reply to the conversational email 414 in bolded type or any other appropriate indication.

Sender 430 may indicate a message as conversational email 414 at composition time or any other time thereafter. Sender 430 may indicate the message as conversational email 414 by selecting such an option from the toolbar 412. For example, the user may select "conversation" type from a drop down menu under "format" in toolbar 412. Alternatively, any of the first through fourth recipients 440 may convert a "regular" message type to a "conversation" type by a similar selection mechanism. Sender 430 or any of first through fourth recipients may convert conversational email 414 to a conventional message type also by similar selection mechanism. In such a conversion, view pane 450 may display existing message threads in chronological order and new message threads in a conventional manner from that point forward. Computing device 102R running an MUA application program or computing device 102 running an MTA application program may perform the message conversion from conventional email to conversational email or vice versa.

Figure 5:
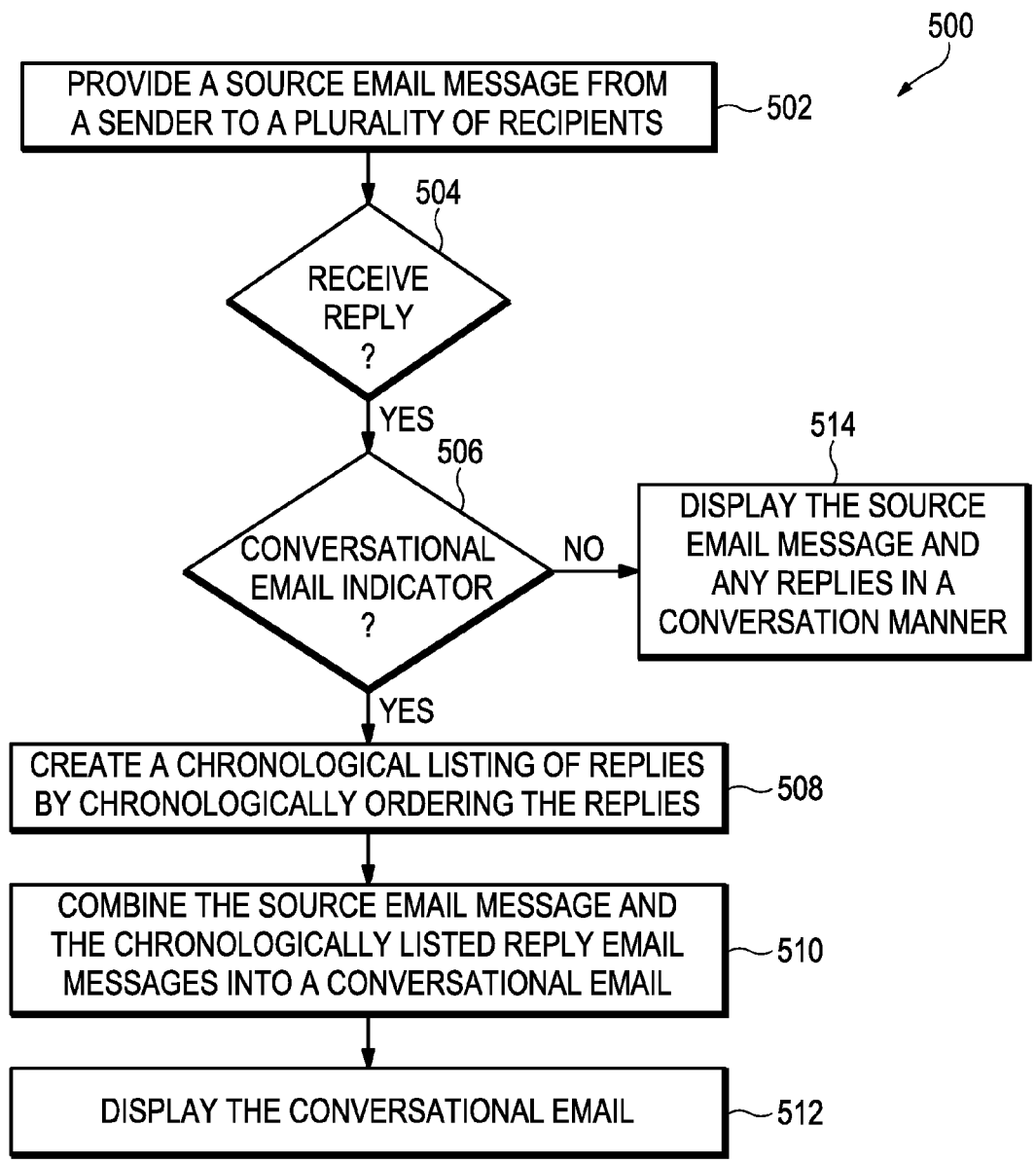
FIG. 5 depicts a flowchart of an exemplary method for creating a conversational email message.

FIG. 5 depicts a flowchart of an exemplary method for creating a conversational email message. Referring to FIG. 5, method 500 may provide a source email message from a sender to a plurality of recipients at 502. At 504, method 500 may receive a reply to the source email message from at least one recipient of the plurality of recipients. At 506, method 500 may determine the existence of a conversational email indicator by decoding a header associated with the reply. If a conversational email indicator exists, at 508, method 500 may create a chronological listing of replies by chronologically ordering all of the replies from any of the plurality of recipients or the sender received up to that time. At 510, method 500 may combine the source email message and the chronological listing of replies into a conversational email. At 512, method 500 may cause the display of the conversational email on a monitor or display. If no conversational email indicator exists at 506, at 514, method 500 may cause the display of the source email and any subsequently received replies from the at least one recipient in a conventional manner on a monitor or display.

Method 500 may create the chronological listing of replies in response to having decoded a timestamp associated with each of the replies received from any of the plurality of recipients or the sender. Method 500 further may continuously update the chronological listing in response to receiving further replies from any of any of the plurality of recipients or from the sender. Method 500 may convert the conversational message to at least one message thread in response to the conversational email indicator being replaced with a message thread indicator in any of the replies received from any of the plurality of recipients or from the sender. Method 500 further may cause display of a symbol associated with any of the replies received from any of the plurality of recipients or from the sender.

The invention claimed is:

1. A method, comprising:
providing an outgoing email message from a sender to a plurality of recipients using a computing device executing an email application program;
creating a chronological listing of incoming email messages by chronologically ordering any incoming email messages related to the outgoing email message received by the computing device from any of the plurality of recipients or from the sender in response to a conversational message indicator;
combining the outgoing email message and the chronological list into a conversational email message comprising the outgoing email message and a complete set of incoming email messages in chronological order; and
displaying a graphical representation of the conversational message indicator and a graphical representation of the at least one of the incoming email messages;
wherein the conversational message indicator is associated with at least one of the incoming email messages; and
wherein selection of the conversational message indicator converts the conversational email message into a conventional email message.

2. The method of claim 1, further comprising enabling creation of the outgoing email message by the sender using the computing device.

3. The method of claim 1, wherein creating the chronological listing of incoming email messages occurs in response to a timestamp associated with each of the incoming email messages received by the computing device from any of the plurality of recipients or from the sender.

4. The method of claim 1, further comprising converting the conversational email message to at least one email message thread in response to the conversational message indicator being replaced with a message thread indicator in any of the incoming email messages received by the computing device from any of the plurality of recipients or from the sender.

5. The method of claim 1, further comprising causing display of a symbol associated with unread incoming email messages received by the computing device from any of the plurality of recipients or from the sender that are included in the conversational email message.

6. The method of claim 3, further comprising continuously updating the chronological listing in response to the computing device receiving any further incoming email messages from any of the plurality of recipients or from the sender.

7. An apparatus, comprising:
a computing device configured to:
transmit an outgoing email message from a sender to a plurality of recipients;
create a conversational email message by combining the outgoing email message with a chronological listing of a complete set of reply email messages received from any of the plurality of recipients or the sender in response to a conversational email indicator;
associate the conversational message indicator with at least one of the reply email messages; and
enable a graphical representation of the conversational message indicator;
wherein selection of the conversational message indicator converts the conversational email message into a conventional email message; and
a memory device configured to store the outgoing email message or any of the reply email messages.

8. The apparatus of claim 7, wherein the outgoing email message or any of the reply email messages comprises the conversational email indicator.

9. The apparatus of claim 7, wherein the computing device is further configured to enable creation of the outgoing email message by the sender.

10. The apparatus of claim 7, wherein the computing device is further configured to generate the chronological listing of the reply email messages in response to a timestamp associated with each of the reply email messages received from any of the plurality of recipients or a reply email message received from the sender.

11. The apparatus of claim 7, wherein the computing device is further configured to convert the conversational email message to at least one email message thread in response to the conversational message indicator being replaced with a message thread indicator in any of the reply email messages received from any of the plurality of recipients or in response to a reply email message received from the sender.

12. The apparatus of claim 7, wherein a display device is further configured to display a symbol associated with unread reply email messages included in the conversational email message.

13. The apparatus of claim 10, wherein the computing device is further configured to update the chronological listing in response to the computing device receiving each of the reply email messages from any of the plurality of recipients or in response to the computing device receiving the reply email message from the sender.

14. An apparatus, comprising:
a memory device configured to store instructions defining an email messaging application; and
a processing device configured to execute instructions stored in the memory device to:
provide an outgoing email message from a sender to a plurality of recipients;
create a chronological list by chronologically ordering any incoming email messages received by a computing device from any of the plurality of recipients or from the sender in response to the outgoing email message or any of the incoming email messages comprising a conversational message indicator;
combine the outgoing email message and the chronological list into a conversational email message comprising both the outgoing email message and a complete set of incoming email messages in chronological order;
associate the conversational message indicator with at least one of the incoming email messages; and
enable displaying a graphical representation of the conversational email message indicator and a graphical representation of the at least one of the incoming email messages;
wherein the incoming email messages are associated with the outgoing email message; and
wherein selection of the conversational message indicator converts the conversational email message into a conventional email message.

15. The apparatus of claim 14, wherein the processing device is configured to execute the instructions stored in the memory device further to enable creation of the outgoing email message by the sender.

16. The apparatus of claim 14, wherein the processing device is configured to execute the instructions stored in the memory device further to create the chronological list in response to a timestamp associated with each of the incoming email messages received from any of the plurality of recipients or in response to each reply email message received from the sender.

17. The apparatus of claim 14, wherein the processing device is configured to execute the instructions stored in the memory device further to convert the conversational email message to at least one email message thread in response to the conversational message indicator being replaced with a message thread indicator in any of the incoming email messages received by the computing device from any of the plurality of recipients or from the sender.

18. The apparatus of claim 14, wherein the processing device is configured to execute the instructions stored in the memory device further to cause a display of a symbol associated with unread incoming email messages comprising the conversational email message.

19. The apparatus of claim 16, wherein the processing device is configured to execute the instructions stored in the memory device further to continuously update the chronological list in response to each incoming email message received from any of the plurality of recipients or in response to each reply email message received from the sender.

20. A computer readable storage device comprising executable instructions stored thereon that configure a processing device to perform operations comprising:
providing an outgoing email message from a sender to a plurality of recipients;
creating a chronological list by chronologically ordering incoming email messages from any of the plurality of recipients or from the sender in response to the outgoing email message or any of the incoming email messages comprising a conversational message indicator, wherein the incoming email messages are associated with the outgoing email message;
combining the outgoing email message and the chronological list into a conversational email message comprising the outgoing email message and a complete set of the incoming email messages in chronological order;

associating the conversational message indicator with at least one of the incoming email messages; and causing display of a graphical representation of the conversational message indicator and a graphical representation of the at least one of the incoming email messages;

wherein selection of the conversational message indicator converts the conversational email message into a conventional email message in which each email message thread received subsequent to the selection are displayed independently.

21. The computer readable storage device of claim 20, wherein the processing device is configured to perform operations further comprising:

enabling creation of the outgoing email message by the sender.

22. The computer readable storage device of claim 20, wherein the processing device is configured to perform operations further comprising:

creating the chronological list in response to a timestamp associated with each of the incoming email messages from any of the plurality of recipients or from the sender.

23. The computer readable storage device of claim 20, wherein the processing device is configured to perform operations further comprising:

updating the chronological list in response to receiving each of the incoming email messages from any of the plurality of recipients or in response to receiving each reply email message from the sender.

24. The computer readable storage device of claim 20, wherein the processing device is configured to perform operations further comprising:

converting the conversational email message to at least one message thread in response to the conversational message indicator being replaced with a message thread indicator in any of the incoming email messages from any of the plurality of recipients or in any reply email message from the sender.

25. The computer readable storage device of claim 20, wherein the processing device is configured to perform operations further comprising:

causing display of a symbol associated with unread incoming email messages comprising the conversational email message.

* * * * *